United States Patent
Bellucci et al.

(10) Patent No.: US 8,214,798 B2
(45) Date of Patent: Jul. 3, 2012

(54) AUTOMATIC CALCULATION OF ORTHOGONAL DEFECT CLASSIFICATION (ODC) FIELDS

(75) Inventors: Silvia Bellucci, Rome (IT); Bruno Portaluri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 12/174,585

(22) Filed: Jul. 16, 2008

(65) Prior Publication Data

US 2010/0017787 A1    Jan. 21, 2010

(51) Int. Cl.
G06F 9/45 (2006.01)

(52) U.S. Cl. .............. 717/111; 702/186; 714/37; 707/4; 707/204

(58) Field of Classification Search .................. 717/111; 702/186; 714/37
See application file for complete search history.

(56) References Cited

U.S. PATENT DOCUMENTS

| | | | |
|---|---|---|---|
| 6,987,873 | B1 | 1/2006 | Ben-Porath et al. |
| 2006/0167866 | A1* | 7/2006 | Farchi et al. ...................... 707/4 |
| 2006/0265188 | A1* | 11/2006 | French et al. ................. 702/185 |
| 2007/0162257 | A1* | 7/2007 | Kostyk et al. ................. 702/182 |
| 2007/0174023 | A1* | 7/2007 | Bassin et al. .................. 702/186 |
| 2008/0046484 | A1* | 2/2008 | Ellis et al. ...................... 707/204 |
| 2008/0201611 | A1* | 8/2008 | Bassin et al. ..................... 714/37 |

OTHER PUBLICATIONS

ODC Standard Definitions for Software Development With Trivoli Modifications, Version 5.2, Center of Software Engineering IBM, 2004, p. 1-39, Yorktown Heights, NY.
Details of ODC v. 5.11; http://www.research.ibm.com/softeng/ODC/DETODC.HTM, downloaded Jul. 16, 2008, last edited Feb. 1, 2002.
R. Chillarege et al., Orthogonal Defect Classification—A Concept for In-Process Measurements,http://www.chillarege.com/odc/articles/odcconcept/odc.html, Nov. 1992.
Stoerzer, Maximillian et al., "Finding Failure-Inducing Changes in Java Programs using Change Classification", SIGSOFT'06/FSE-14, Nov. 5-11, 2006, pp. 1-12.
Xie, Tao et al., "Mining Software Engineering Data", 29th International Conference on Software Engineering—Companion, ICSE 2007, http://ase.csc.ncsu.edu/dmse/miningalgs.html, May 20-26, 2007, 2 pages.

* cited by examiner

*Primary Examiner* — Don Wong
*Assistant Examiner* — Lynda Dinh
(74) *Attorney, Agent, or Firm* — Stephen J. Walder, Jr.; Jeffrey S. LaBaw

(57) ABSTRACT

Mechanisms for Orthogonal Defect Classification (ODC) analysis in a computing system are provided. One implementation involves determining a defect in a software application, providing a defect fix to the software application, linking the source code fix to the defect, and automatically performing ODC analysis and calculating ODC information based on calculations against the source code linked to the defect fixed.

15 Claims, 3 Drawing Sheets

AUTOMATIC CALCULATION OF ORTHOGONAL DEFECT CLASSIFICATION (ODC) FIELDS

BACKGROUND OF THE INVENTION

1. Field of the Invention

The present invention relates generally to software defect analysis and in particular to software defect analysis using ODC.

2. Background Information

Orthogonal Defect Classification (ODC) was formulated by IBM Research. ODC is a scheme to capture the semantics of each software defect quickly. It is the definition and capture of defect attributes that make mathematical analysis and modeling possible. Analysis of ODC data provides a valuable diagnostics method for evaluating the various phases of the software life cycle (e.g., design, development, test and service) and the maturity of the product. ODC makes it possible to push the understanding and use of defects well beyond quality.

ODC methodology requires an effective ODC validation process in place. ODC fields can be divided between opener ones (i.e., the ones filled in when the defect is opened) and responder ones (i.e., who fixes the defects has the responsibility to fill them).

In existing approaches, ODC classification and validation involve manual time consuming processes that require product knowledge and ODC experience. Among all the ODC fields, the following provide objective values (i.e., not subject to interpretation): ODC Target, ODC Defect Type, ODC Qualifier and ODC Source History. Specifically, ODC Target represents the high level identity of the entity that was fixed. ODC Defect Type represents the actual correction that was made (the "type" captures the size, scope, and complexity of the fix). ODC Defect Qualifier captures the element of a non-existent, wrong or irrelevant implementation. ODC Source History is the selection which identifies the history of the program code or information which was fixed (applicable to all defect Targets). ODC classification also involves organizational costs wherein ODC fields must be set on each field and must be validated by a senior developer.

SUMMARY OF THE INVENTION

The invention provides a method and system for Orthogonal Defect Classification (ODC) analysis in a computing system. One embodiment involves determining a defect in a software application, providing a defect fix to the software application, linking the source code fix to the defect, and automatically performing ODC analysis and calculating ODC information based on calculations against the source code linked to the defect fixed.

Calculating ODC information may further involve extracting the source code before and after the fix, determining changes representing lines of code added, deleted and modified, and calculating ODC fields based on said code changes. Automatically calculating ODC fields may further include calculating Defect target, Defect type, Defect qualifier and Source history, based on the code changes.

Automatically calculating ODC fields may further include calculating a set of measures including one or more of: Number of lines inserted (CI), Number of lines modified (CM), Number of lines deleted (CD), Number of changed files (F), Number of components impacted by the changes (NC), File extensions (FE), and Number of lines changed (CC), wherein CC is a function of CI, CM and CD; and calculating the ODC fields based on said set of measures.

Calculating the ODC fields based on said set of measures may further include determining Defect qualifier based on the number and type of codes lines changed, as:

Missing: $CI > CM + CD$,
Incorrect: $CM > CI + CD$,
Extraneous: $CD > CI + CM$.

Calculating the ODC fields based on said set of measures may further include determining Defect type as a function of the total number of code lines changed, as:

Assignment: $CI = 1$,
Checking: $CC < 5$,
Algorithm: $5 < CC < 25$,
Function: $25 < CC < 100$,
Interface: $NC > 1$.

Calculating the ODC fields based on said set of measures may further include determining Defect target representing a component in which code has been changed, as:

Requirements: Defect Qualifier = missing AND Defect Type IN ("interface", "relationship", "timing", "function"),
Design: Defect Qualifier = incorrect AND Defect Type IN ("interface", "relationship", "timing", "function"),
Code: Main application components,
Build: Build component,
Information: Document components,
Natural Language Support (NLS): L10N components.

Calculating the ODC fields based on said set of measures may further include determining Source History representing differences between the code before a change and a reference baseline determined by a customizable code level that identifies the base code, as:

Base: Updated code was present in the base code,
New: Updated code was not present in the base code,
Refixed: Updated code not present in the base code,
Rewritten: Updated code was present in the base code.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for automatic calculation of Orthogonal Defect Classification (ODC) fields. One embodiment involves calculation of one or more ODC fields (e.g., ODC responder fields) in a defect tracking tool (e.g., defect tracking software module) according to the invention, to assist software developers both in filling them and to validating them. Since every software modification (e.g., defect fix) implies a change, the defect tracking tool analyzes the changes to provide defaults to ODC responder fields (i.e., ODC Target, ODC Defect Type, ODC Qualifier and ODC Source History). The defect tracking tool automates ODC classification and validation.

Figure 1:
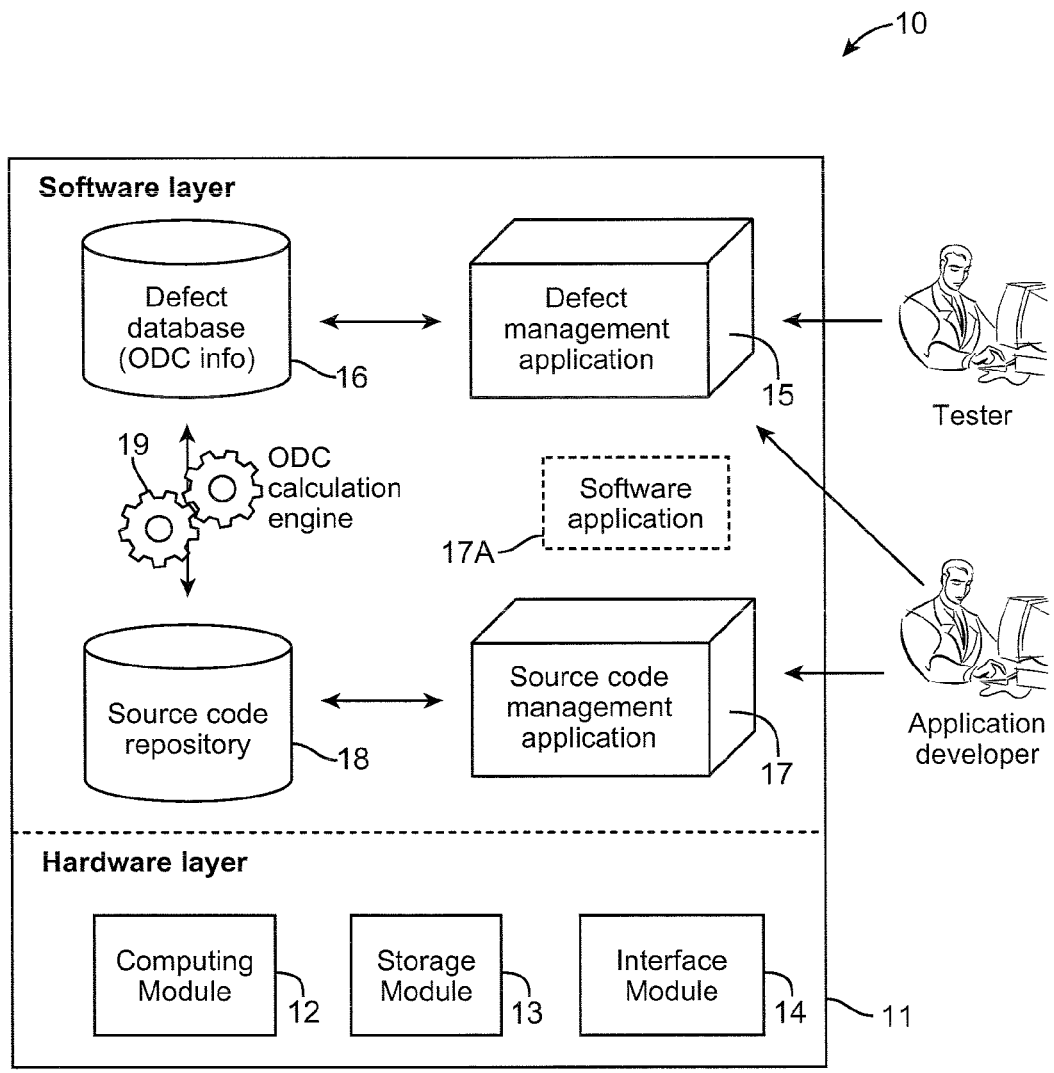
FIG. 1 shows a functional block diagram of a system implementing Orthogonal Defect Classification (ODC) analysis, according to an embodiment of the invention.

FIG. 1 shows a functional block diagram of a system 10 implementing the above-mentioned embodiment of the defect tracking tool. The system 10 generally includes a hardware layer and a software layer. The software layer executes on the hardware layer.

The hardware layer includes a processing module 11 including a computing module 12, a storage module 13 and an interface module 14. The computing module 12 includes one or more processors to execute application programs comprising instruction codes. The storage module 13 includes one or more storage devices (e.g., disk drive, tape drive, memory, etc.) for storing data. The interface module 14 includes functions that provide various interface capabilities to support communication with other systems, with users, with communication devices, etc. The processing module 11 may be a single processing machine or comprise a set of networked processing machines.

The software layer includes a defect management application 15, a defect database 16, a source code management application 17, a source code repository 18, and an ODC calculation engine 19.

In an example operation scenario, an Application developer (e.g., a software engineer) writes and maintains source code of a software application 17A. Source code for the application 17A is stored in the source code repository 18. A Tester (e.g., a user that performs quality analysis) tests the application 17A and utilizes the defect management application 16 to create, manage and classify the defects that the Tester found in the software application 17A. The Application developer utilizes the source code management application 17 to load, view and edit the source code. Further, the Application developer also utilizes the defect management application 15 to view defects that testers have found, to fix those defects and load the fixes in the source code.

Specifically, the defect management application 15 is configured to store defects data, wherein for each defect, information is stored to characterize the defect, including, for example: severity, priority, phase found, software component, ODC fields, etc. The source code management application 17 is configured to enable software developers to store, and share with other developers, the source code in the source code repository 18. The source code management application 17 may be integrated with the defect management application 15. Preferably the defects are linked with the required code that fixes the problem (example implementations of such linking functions include IBM CMVC or IBM Rational Clear Quest). The defect database 16 comprises a relational database that stores defects information. The source code repository 18 comprises a protected file system or a database that stores the source code securely. The source code repository 18 cooperates with the source code management application 17 to store the history of changes made to the source code. The ODC calculation engine 19 comprises a software module configured for automatically calculating the ODC fields (i.e., ODC Target, ODC Defect Type, ODC Qualifier and ODC Source History), according to the invention.

Figure 2:
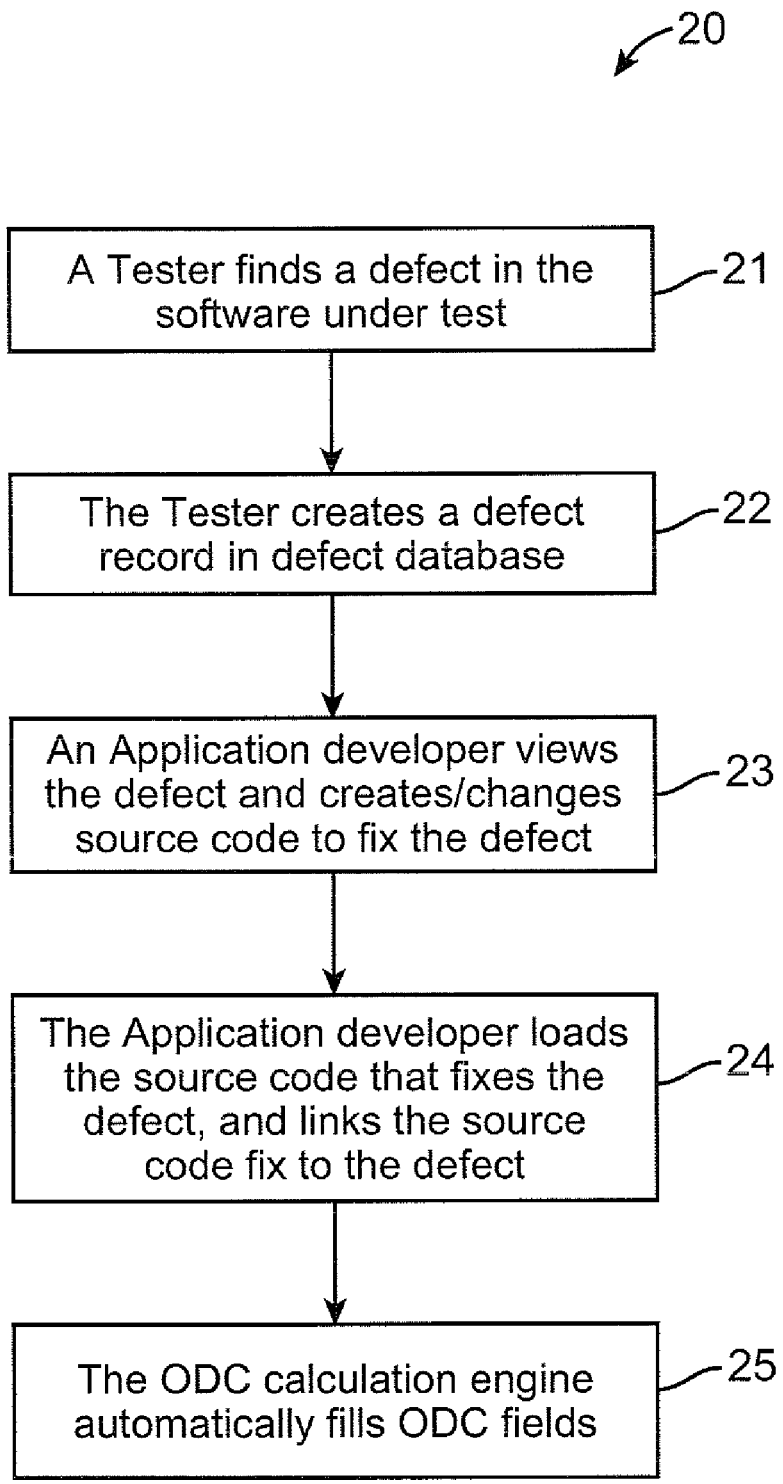
FIG. 2 shows a flowchart of a process for ODC analysis, according to an embodiment of the invention.

FIG. 2 shows a flowchart of a process 20 involving a user interaction scenario with the system 10 for detecting code defects, fixing code defects and then automatically calculating said ODC fields via ODC calculation engine 19, according to an embodiment of the invention, including:

Block 21: A Tester finds a defect in the software under test 17A.

Block 22: The Tester creates a defect record in the defect database.

Block 23: An Application developer views the defect and creates/changes source code to fix the defect.

Block 24: The Application developer loads the source code that fixes the defect, and links the source code fix to the defect.

Block 25: The ODC calculation engine automatically determines and fills ODC fields based on source code changes.

Conventionally, the application developer uses knowledge and experience to find the proper values for the ODC fields. According to the invention however, the ODC calculation engine automatically determines the ODC fields based on calculations against the source code linked to the defect that is being fixed.

Figure 3:
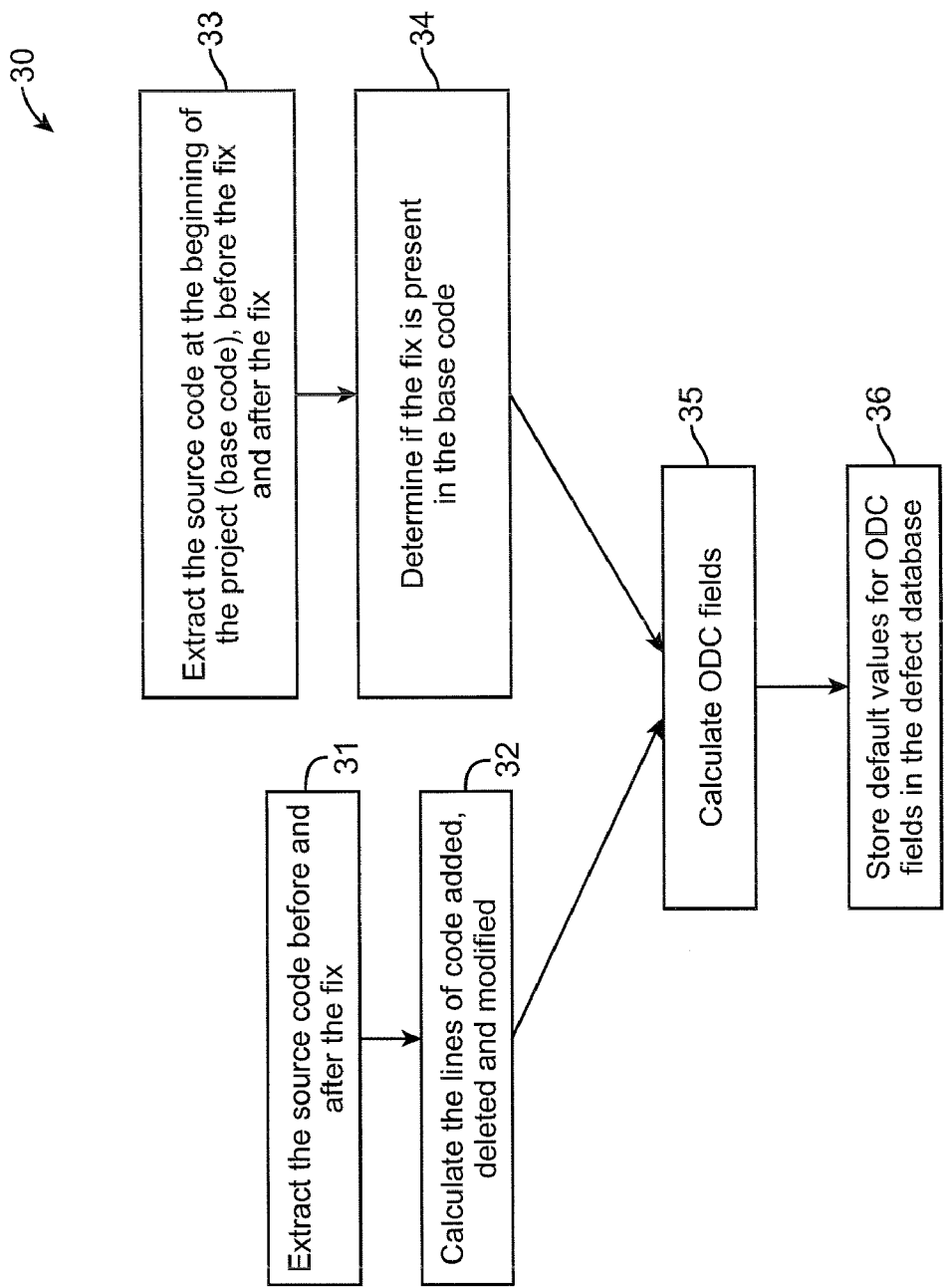
FIG. 3 shows a flowchart of a process for automatic ODC field calculation, according to an embodiment of the invention.

FIG. 3 shows a flowchart of a process 30 performed by the ODC calculation engine. The process 30 is preferably performed as soon after the Developer loads the fix and links the code with the defect. The process 30 includes:

Step 31: Extract the source code before and after the fix.

Step 32: Calculate the lines of code added, deleted and modified.

Step 33: Extract the source code at the beginning of the project (base code), before the fix and after the fix.

Step 34: Determine if the fix (difference in code between before and after the fix) touches parts of the code that were not changed between base code and code before the fix. This information is later used to determine the ODC Source History field.

Step 35: Calculate ODC fields using ODC calculation algorithms (detailed further below) based on code changes. This provides default values for ODC fields that will help the Developer in filling the correct values.

Step 36: Store default values for ODC fields in the defect database.

Validating the ODC fields requires (from a validation stand point) analyzing the changes. The following ODC fields have a clear relationship with the underlying code changes: Defect target, Defect type, Defect qualifier, Source history. In one embodiment according to the invention, the system analyzes two snapshots of a set of source files and calculates a set of measures to determine the above-mentioned ODC fields. Said measures include: Number of lines inserted (CI), Number of lines modified (CM), Number of lines deleted (CD), Number of lines changed (CC) (i.e., CI+CM+CD), Number of changed files (F), Number of components impacted by the changes (NC), and File extensions (FE). In one example, Code versioning tools such as Configuration Management & Version Control (CMVC) which track code changes associated with defects can be utilized, wherein changes can be programmatically analyzed to determine said measures for calculating the above-mentioned ODC fields. Specifically, said measures are used by the ODC calculation engine to calculate the following ODC fields, as:

Defect qualifier: The main indicator to be used for calculation Defect qualifier is the number and type of codes lines changed:

> Missing: $CI > CM + CD$.
> Incorrect: $CM > CI + CD$.
> Extraneous: $CD > CI + CM$.

Defect type: Is based on total number of code lines changed:

> Assignment: $CI = 1$
> Checking: $CC < 5$.
> Algorithm: $5 < CC < 25$.
> Function: $25 < CC < 100$.
> Interface: $NC > 1$.

Defect target: Represents component in which code has been changed

> Requirements: Defect Qualifier = missing AND Defect Type IN ("interface", "relationship", "timing", "function").
> Design: Defect Qualifier = incorrect AND Defect Type IN ("interface", "relationship", "timing", "function").
> Code: Main application components.
> Build: Build component.
> Information: Doc components.
> Natural Language Support (NLS): L10N components.

Source History: The differences between the code before a change and a reference baseline are determined by a customizable "code level" that identifies the base code:

> Base: Updated code was present in the base code.
> New: Updated code was not present in the base code.
> Refixed: Updated code not present in the base code (changes were introduced recently by another defect).
> Rewritten: Updated code was present in the base code (changes were introduced recently by another defect).

In another embodiment, the automatic ODC field calculation process can be applied in a simplified process where no human intervention is required. In this case, ODC fields are calculated based on the same calculation as above but the Developer and/or Tester can only view the calculated values. This may not provide an optimum quality of the ODC fields since the ODC calculation determines the most probable value of each field. However, ODC field values are provided for analysis to existing projects without additional costs (no human intervention). The ODC calculation engine can be applied to code of an old software project, allowing it to gather historical data on completed projects that can be used to better plan future product development cycles.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof, however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of Orthogonal Defect Classification (ODC) analysis in a computing system, comprising:
   determining a defect in a software application;
   providing a source code fix to the software application for fixing, in the source code, the determined defect in the software application;
   linking the source code fix to the defect; and
   automatically performing ODC analysis and calculating ODC information based on calculations against the source code fix linked to the defect, wherein calculating ODC information further includes:
   extracting the source code before and after the source code fix;
   determining changes representing lines of code added, deleted and modified;
   extracting the base code before the source code fix;
   determining if the source code fix touches parts of the source code that were not changed between base code and updated code; and
   calculating ODC fields based on said code changes.

2. The method of claim 1, wherein automatically calculating ODC fields further includes calculating Defect target, Defect type, Defect qualifier and Source history, based on the code changes.

3. The method of claim 2 wherein automatically calculating ODC fields further includes:
   calculating a set of measures including one or more of: Number of lines inserted (CI), Number of lines modified (CM), Number of lines deleted (CD), Number of changed files (F), Number of components impacted by the changes (NC), File extensions (FE), and Number of lines changed (CC), wherein CC is a function of CI, CM and CD; and
   calculating the ODC fields based on said set of measures.

4. The method of claim 3 wherein calculating the ODC fields based on said set of measures further includes determining Defect qualifier based on the number and type of codes lines changed, as:

> Missing: $CI > CM + CD$,
> Incorrect: $CM > CI + CD$,
> Extraneous: $CD > CI + CM$.

5. The method of claim 3 wherein calculating the ODC fields based on said set of measures further includes determining Defect type as a function of the total number of code lines changed, as:

> Assignment: CI = 1,
> Checking: CC < 5,
> Algorithm: 5 < CC < 25,
> Function: 25 < CC < 100,
> Interface: NC > 1.

6. The method of claim 3 wherein calculating the ODC fields based on said set of measures further includes determining Defect target representing a component in which code has been changed, as:

Requirements: Defect Qualifier = missing AND Defect Type IN ("interface", "relationship", "timing", "function"),
Design: Defect Qualifier = incorrect AND Defect Type IN ("interface", "relationship", "timing", "function"),
Code: Main application components,
Build: Build component,
Information: Document components,
NLS: L10N components.

7. The method of claim 3 wherein calculating the ODC fields based on said set of measures further includes determining Source History representing differences between the code before a change and a reference baseline determined by a customizable code level that identifies the base code, as:

> Base: Updated code was present in the base code,
> New: Updated code was not present in the base code,
> Refixed: Updated code not present in the base code,
> Rewritten: Updated code was present in the base code.

8. A system Orthogonal Defect Classification (ODC) analysis, comprising: a defect management module configured for maintaining information about a defect in a software application;
a source code management module configured for maintaining the software application source code and changes representing a source code fix to the software application for fixing, in the source code, a determined defect in the software application, wherein the source code fix is linked to the defect; and
an ODC calculation module configured for automatically performing ODC analysis and calculating ODC information based on calculations against the source code fix linked to the defect, wherein the ODC calculation module is further configured for:
extracting the source code before and after the source code fix;
determining changes representing lines of code added, deleted and modified
extracting the base code before the source code fix;
determining if the source code fix touches parts of the source code that were not changed between base code and updated code; and
calculating ODC fields based on said code changes.

9. The system of claim 8, wherein the ODC calculation module is further configured for automatically calculating ODC fields by calculating Defect target, Defect type, Defect qualifier and Source history, based on the code changes.

10. The system of claim 9 wherein the ODC calculation module is further configured for calculating the ODC fields based on a said set of measures including one or more of: Number of lines inserted (CI), Number of lines modified (CM), Number of lines deleted (CD), Number of changed files (F), Number or components impacted by the changes (NC), File extensions (FE), and Number of lines changed (CC), wherein CC is a function of CI, CM and CD.

11. The system of claim 10 wherein the ODC calculation module is further configured for determining Defect qualifier based on the number and type of codes lines changed, as:

> Missing: CI > CM + CD,
> Incorrect: CM > CI + CD,
> Extraneous: CD > CI + CM.

12. The system of claim 10 wherein the ODC calculation module is further configured for determining Defect type as a function of the total number of code lines changed, as:

> Assignment: CI = 1,
> Checking: CC < 5,
> Algorithm: 5 < CC < 25,
> Function: 25 < CC < 100,
> Interface: NC > 1.

13. The system of claim 10 wherein the ODC calculation module is further configured for determining Defect target representing a component in which code has been chanced, as:

Requirements: Defect Qualifier = missing AND Defect Type IN ("interface", "relationship", "timing", "function"),
Design: Defect Qualifier = incorrect AND Defect Type IN ("interface", "relationship", "timing", "function"),
Code: Main application components,
Build: Build component,
Information: Document components,
NLS: L10N components.

14. The system of claim 10 wherein the ODC calculation module is further configured for determining Source History representing differences between the code before a change and a reference baseline determined by a customizable code level that identifies the base code, as:

> Base: Updated code was present in the base code,
> New: Updated code was not present in the base code,
> Refixed: Updated code not present in the base code,
> Rewritten: Updated code was present in the base code.

15. A computer program product for Orthogonal Defect Classification (ODC) analysis of a software application, comprising a non-transitory computer usable medium including a computer readable program, wherein the computer readable program when executed on a computer causes the computer to:
automatically perform ODC analysis of a software application with a source code fix to fix a detected defect, wherein the source code fix is linked to the detected defect; and calculate ODC information based on calculations against the source code fix linked to the detected defect, wherein the calculating ODC information further causes the computer to:
extract the source code before and after the source code fix;
determine changes representing lines of code added, deleted and modified;
determine if the source code fix touches parts of the source code that were not changed between base code and updated code;
extract the base code and before the source code fix; and
calculate ODC fields based on said code changes.

* * * * *